United States Patent
Pahlevaninezhad et al.

(10) Patent No.: US 9,729,085 B2
(45) Date of Patent: Aug. 8, 2017

(54) OBSERVER-BASED CONTROL SYSTEM FOR GRID-CONNECTED DC/AC CONVERTERS WITH LCL-FILTER

(71) Applicants: Majid Pahlevaninezhad, Kingston (CA); Suzan Eren, Kingston (CA); Praveen Jain, Kingston (CA)

(72) Inventors: Majid Pahlevaninezhad, Kingston (CA); Suzan Eren, Kingston (CA); Praveen Jain, Kingston (CA)

( * ) Notice: Subject to any disclaimer, the term of this patent is extended or adjusted under 35 U.S.C. 154(b) by 69 days.

(21) Appl. No.: 14/838,505

(22) Filed: Aug. 28, 2015

(65) Prior Publication Data
US 2016/0094149 A1 Mar. 31, 2016

Related U.S. Application Data

(60) Provisional application No. 62/056,001, filed on Sep. 26, 2014.

(51) Int. Cl.
| | | |
|---|---|---|
| *H02M 7/538* | (2007.01) | |
| *H02M 7/5387* | (2007.01) | |
| *H02M 1/12* | (2006.01) | |
| *H02M 1/00* | (2006.01) | |

(52) U.S. Cl.
CPC ....... *H02M 7/53871* (2013.01); *H02M 1/126* (2013.01); *H02M 2001/0009* (2013.01)

(58) Field of Classification Search
CPC .......... H02M 1/12; H02M 1/126; H02M 7/48; H02M 7/4826; H02M 7/5387; H02M 7/53871
See application file for complete search history.

(56) References Cited

U.S. PATENT DOCUMENTS

| | | | | |
|---|---|---|---|---|
| 6,519,168 B2* | 2/2003 | Jain | ..................... | H02M 7/5387 327/423 |
| 2016/0065049 A1* | 3/2016 | Wu | ........................ | H02M 1/12 363/40 |
| 2016/0276955 A1* | 9/2016 | Harada | ................... | H02M 1/32 |

OTHER PUBLICATIONS

Dasgupta, S. et al. "Single-Phase Inverter Control Techniques for Interfacing Renewable Energy Sources With Microgrid Part I: Parallel-Connected Inverter Topology With Active and Reactive Power Flow Control Along With Grid Current Shaping," Power Electronics, IEEE Transactions on, vol. 26, No. 3, pp. 717-731, Mar. 2011.

Selvajyothi, K. et al. "Reduction of Voltage Harmonics in Single Phase Inverters Using Composite Observers," Power Delivery, IEEE Transactions on, vol. 25, No. 2, pp. 1045-1057, Apr. 2010.

Mastromauro, R.A. et al. "Study of the Effects of Inductor Nonlinear Behavior on the Performance of Current Controllers for Single-Phase PV Grid Converters," Industrial Electronics, IEEE Transactions on, vol. 55, No. 5, pp. 2043-2052, May 2008.

(Continued)

*Primary Examiner* — Matthew Nguyen
(74) *Attorney, Agent, or Firm* — Brion Raffoul

(57) ABSTRACT

Systems related to controlling a DC/AC converter. A control system uses a nonlinear adaptive observer to estimate the state variables inverter current and converter voltage using a sensed grid current and a bus voltage as inputs. For non-observable points (such as when the duty cycle=0.5), the required information can be found from the DC bus voltage.

7 Claims, 12 Drawing Sheets

(56) References Cited

OTHER PUBLICATIONS

Mohamed, Y.A.-R.I., "Mitigation of Converter-Grid Resonance, Grid-Induced Distortion, and Parametric Instabilities in Converter-Based Distributed Generation," Power Electronics, IEEE Transactions on, vol. 26, No. 3, pp. 983-996, Mar. 2011.

Liserre, M. et al. "Design and control of an LCL-filter-based three-phase active rectifier," Industry Applications, IEEE Transactions on, vol. 41, No. 5, pp. 1281-1291, Sep.-Oct. 2005.

Tang, Y. et al. "Generalized Design of High Performance Shunt Active Power Filter With Output LCL Filter," Industrial Electronics, IEEE Transactions on, vol. 59, No. 3, pp. 1443-1452, Mar. 2012.

Jeong, H. et al. "Performance Improvement of LCL-Filter-Based Grid-Connected Inverters Using PQR Power Transformation," Power Electronics, IEEE Transactions on, vol. 25, No. 5, pp. 1320-1330, May 2010.

Liu, F. et al. "Parameter Design of a Two-Current-Loop Controller Used in a Grid-Connected Inverter System With LCL Filter," Industrial Electronics, IEEE Transactions on, vol. 56, No. 11, pp. 4483-4491, Nov. 2009.

Gabe, I. et al. "Design and Implementation of a Robust Current Controller for VSI Connected to the Grid Through an LCL Filter," Power Electronics, IEEE Transactions on, vol. 24, No. 6, pp. 1444-1452, Jun. 2009.

Shen, G. et al. "A New Feedback Method for PR Current Control of LCL-Filter-Based Grid-Connected Inverter," Industrial Electronics, IEEE Transactions on, vol. 57, No. 6, pp. 2033-2041, Jun. 2010.

Shen, G. et al. "An Improved Control Strategy for Grid-Connected Voltage Source Inverters With an LCL Filter," Power Electronics, IEEE Transactions on, vol. 23, No. 4, pp. 1899-1906, Jul. 2008.

Dannehl, J. et al. "Investigation of Active Damping Approaches for PI-Based Current Control of Grid-Connected Pulse Width Modulation Converters With LCL Filters," Industry Applications, IEEE Transactions on, vol. 46, No. 4, pp. 1509-1517, Jul.-Aug. 2010.

Wu, E. et al. "Digital Current Control of a Voltage Source Converter With Active Damping of LCL Resonance," Power Electronics, IEEE Transactions on, vol. 21, No. 5, pp. 1364-1373, Sep. 2006.

Eren, S. et al. "Composite Nonlinear Feedback Control and Stability Analysis of a Grid-Connected Voltage Source Inverter With LCL Filter," Industrial Electronics, IEEE Transactions on, vol. 60, No. 11, pp. 5059, 5074, Nov. 2013.

Eren, S. et al. "An Adaptive Droop DC-Bus Voltage Controller for a Grid-Connected Voltage Source Inverter with LCL Filter," Power Electronics, IEEE Transactions on, vol. 30, No. 99, pp. 1, 2014.

* cited by examiner

US 9,729,085 B2

OBSERVER-BASED CONTROL SYSTEM FOR GRID-CONNECTED DC/AC CONVERTERS WITH LCL-FILTER

RELATED APPLICATIONS

This application is a non-provisional of U.S. Provisional Patent Application No. 62/056,001 filed Sep. 26, 2014.

TECHNICAL FIELD

The present invention relates to control systems for grid-connected DC/AC converters. More specifically, the present invention relates to systems and devices for use in controlling a grid connected DC/AC converter with an LCL-output filter.

BACKGROUND OF THE INVENTION

DC/AC converters produce an AC voltage with the grid frequency from a DC voltage in order to deliver power to the utility grid. The quality of the current injected to the grid by a DC/AC converter is of great importance according to the grid interconnection regulatory standards (e.g. IEEE1547 standard). To this end, a filter is required to filter out the harmonics of the voltage produced by the DC/AC converter and to thereby inject a high quality current to the utility grid.

There are three general types of filter used to attenuate the harmonic contents of the current injected to the utility grid. The commonly used filters are: purely inductive L-filters, LC-filters, and the LCL-filters. Recently, LCL-filters have received a lot of attention as they can provide superior filtering compared to the other filter types. This is due to the additional poles introduced by the LCL-filter structure. However, these two additional complex conjugate poles introduce a relatively low frequency resonance into the control system, thereby making control of the converter very challenging. The control system should be able to provide enough damping for the resonance produced by these complex conjugate poles.

To address the above issue, it is known to use a Proportional Resonant (PR) controller in conjunction with a linear state-feedback controller in order to damp the resonance of the LCL-filter and to thereby control the output current of the DC/AC converter. The linear state-feedback controller provides damping for the closed-loop control system (ensures stability) and the PR-controller provides current reference tracking. The arrangement shown in FIG. 1 shows this approach.

According to FIG. 1, the control system requires two extra measurements ($i_{inv}$, $v_c$) in order to implement the linear state-feedback. The extra sensors required to implement the closed-loop control system contribute to the overall cost of the DC/AC converter. Also, they require extra conditioning circuitry and respective ADCs (Analogue-to-Digital Converters) for digital implementation. Therefore, the extra sensors significantly increase the cost and complexity of the control system.

Based on the above, there is therefore a need for another approach to the above issue. A control scheme that does not require extra sensors and ADC circuitry would meet such a need and can reduce the cost and complexity of DC/AC converters.

SUMMARY OF INVENTION

The present invention provides systems, methods, and devices related to controlling a DC/AC converter. A control system uses a nonlinear adaptive observer to estimate the state variables $i_{inv}$ and $v_C$ using a sensed grid current and a bus voltage as inputs. For non-observable points (such as when the duty cycle=0.5), the required information can be found from the DC bus voltage.

In a first aspect, the present invention provides a system for use in controlling a DC/AC converter, the system comprising:
  a non-linear observer subsystem for estimating an inverter current from said converter and for estimating a converter voltage,
wherein
  outputs of said subsystem are used to control transistors of said converter; and
  said subsystem receives, as input,
    a grid current from said converter, and
    a bus voltage of an input to said converter.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
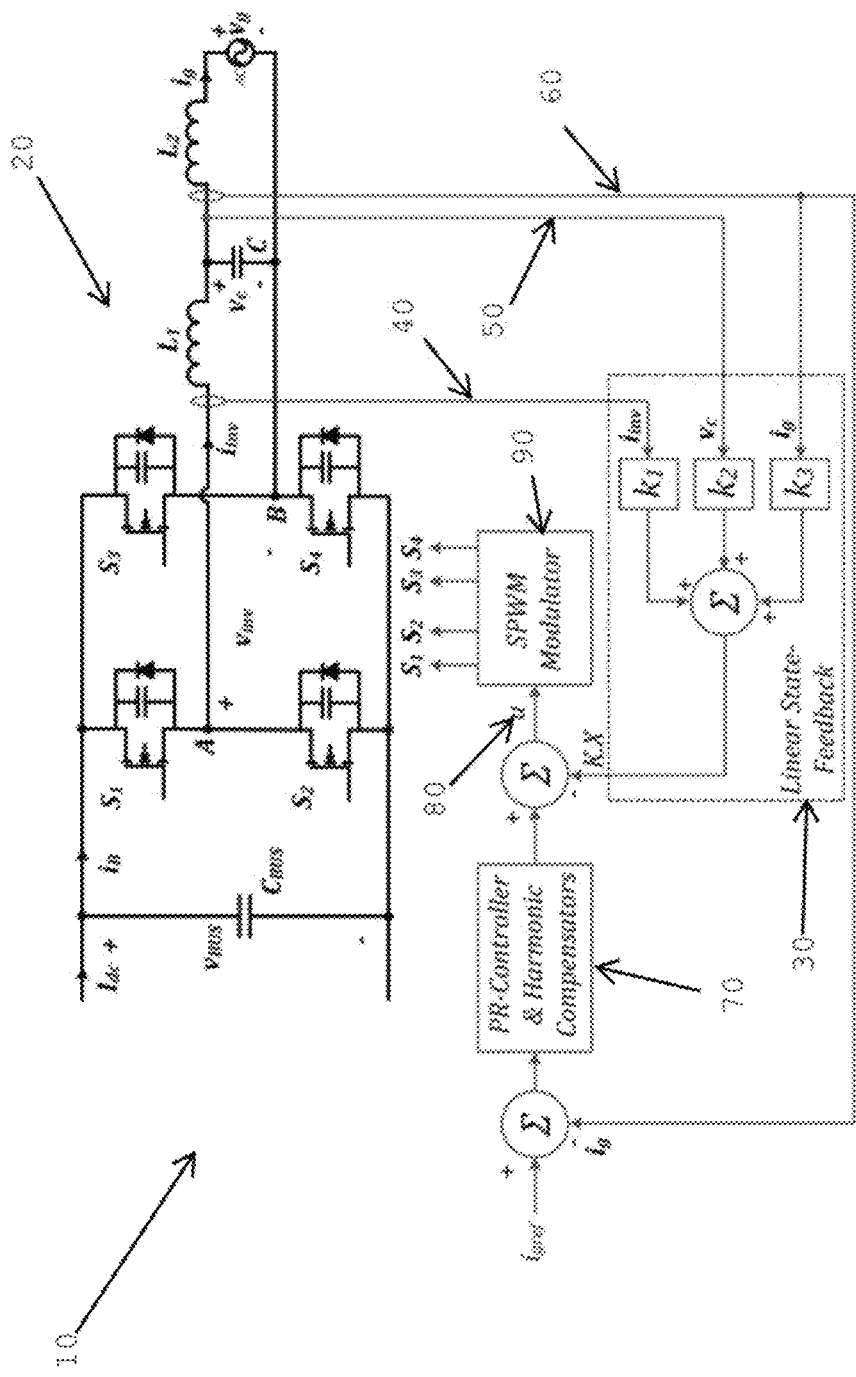
FIG. 1 is a circuit diagram illustrating an LCL-filter equipped DC/AC converter and a control system according to the prior art.

A system according to the prior art is illustrated in FIG. 1. The system 10 in FIG. 1 includes a DC/AC converter circuit 20 which includes an LCL-filter component. The controller circuit uses a linear state-feedback block 30 which receives, as input, the inverter current ($i_{inv}$) 40, the converter voltage ($v_c$) 50, and the grid current ($i_g$) 60. These signals are tapped/retrieved from the converter circuit. The control circuit also uses a block 70 which contains a proportional resonant controller and harmonic compensators. The output of block 70 are subtracted from the output of the linear state feedback block 30 to result in a value u 80 which is received by a SPWM (sinusoidal pulse width modulation) modulator 90. The outputs of this modulator 90 are then sent as control signals to the semiconductors in the converter circuit 20.

According to FIG. 1, the dynamics of the grid-connected DC/AC inverter with LCL-filter is given by:

$$\frac{di_{inv}}{dt} = -\frac{R_1}{L_1}i_{inv} + \frac{1}{L_1}v_{BUS}(2d-1) - \frac{1}{L_1}v_c \quad (1)$$

$$\frac{di_g}{dt} = -\frac{R_2}{L_2}i_g + \frac{1}{L_2}v_c - \frac{1}{L_2}v_g \quad (2)$$

$$\frac{dv_c}{dt} = \frac{1}{C}i_{inv} - \frac{1}{C}i_g \quad (3)$$

$$\frac{dv_{BUS}}{dt} = \frac{1}{C_{BUS}}i_{dc} - \frac{1}{C_{BUS}}(2d-1)i_{inv} \quad (4)$$

where d is the duty-ratio of the full-bridge inverter.

According to Eqns. (1)-(4), the system dynamics represent a control-affine nonlinear system, due to the coupling between the control input (duty-ratio) and the state variables. The system state variables are defined as:

$$x_1 = i_g \quad (5)$$

$$x_2 = i_{inv} \quad (6)$$

$$x_3 = v_C \quad (7)$$

$$x_4 = v_{BUS} \quad (8)$$

The system dynamics can be given by:

$$\dot{X} = f(X) + g(X)u + Ww \quad (9)$$

where $$X = \begin{pmatrix} x_1 \\ x_2 \\ x_3 \\ x_4 \end{pmatrix} = \begin{pmatrix} i_g \\ i_{inv} \\ v_C \\ v_{BUS} \end{pmatrix}$$

$$f(X) = \begin{pmatrix} \frac{1}{L_g}x_3 \\ -\frac{1}{L_{inv}}x_3 \\ \frac{1}{C}x_2 - \frac{1}{C}x_1 \\ 0 \end{pmatrix}, \quad g(X) = \begin{pmatrix} 0 \\ \frac{1}{L_{inv}}x_4 \\ 0 \\ -\frac{1}{C_{BUS}}x_2 \end{pmatrix}$$

$$W = \begin{pmatrix} -\frac{1}{L_g} & 0 \\ 0 & \frac{1}{C_{BUS}} \end{pmatrix}, \quad u = 2d-1, \quad w = \begin{pmatrix} v_g \\ I_{dc} \end{pmatrix}$$

Equation (9) represents a control affine system (the system is control affine because it formulates a linear combination of vector fields f and g on the smooth manifold $\mathfrak{R}^4$). Since the dynamics of the system are nonlinear, designing an observer for this system is challenging. As well, the operating conditions can vary across a very wide range due to the variations of the grid voltage, $v_g$, and of the input dc current $I_{dc}$. One of the main difficulties regarding the design of such an observer is that input dc current $I_{dc}$ in Eqn. (9) is not known and this current can vary across a very wide range.

In order to develop an observer-based control law, the observability of the state variable first has to be examined. In linear systems, observability is independent of the control input. This property stems from the fact that the relationship between the initial state and the measured output is linear. However, in nonlinear systems some singular inputs can make the system unobservable. This is one of the subtleties regarding the observability of nonlinear systems.

In order to analyse the observability of this nonlinear system, it is assumed that the observer dynamics are much faster than the controller dynamics. This is a common practice when designing the observers. Because the measurable states are the DC-bus voltage and the grid current:

$$h = \begin{pmatrix} x_1 \\ x_4 \end{pmatrix} = \begin{pmatrix} i_g \\ v_{BUS} \end{pmatrix},$$

the system dynamics can be rewritten as:

$$\sum_{Inverter} : \begin{cases} \dot{X} = F(X, u) \\ y = h = \begin{pmatrix} x_1 \\ x_4 \end{pmatrix} \end{cases} \quad (10)$$

where $$F(X, u) = \begin{pmatrix} f_1 \\ f_2 \\ f_3 \\ f_4 \end{pmatrix} = \begin{pmatrix} \frac{1}{L_g}x_3 - \frac{1}{L_g}v_g \\ \frac{1}{L_{inv}}x_4 u - \frac{1}{L_{inv}}x_3 \\ \frac{1}{C}x_2 - \frac{1}{C}x_1 \\ \eta - \frac{1}{C_{BUS}}x_2 u \end{pmatrix}$$

where $\eta = \frac{I_{dc}}{C_{BUS}}$.

The observability of the nonlinear system can be examined by using the Lie derivative of the measurable outputs. In particular, the rank of the following matrix determines the observability of the nonlinear system:

$$\Theta = \begin{pmatrix} \nabla h \\ \nabla L_F h \\ \nabla L_F^2 h \\ \nabla L_F^3 h \end{pmatrix} = \quad (11)$$

$$\begin{pmatrix} 1 & 0 & 0 & 1 \\ 0 & -\frac{1}{C_{BUS}}u & \frac{1}{L_g} & 0 \\ -\frac{1}{L_g C} & \frac{1}{L_g C} & \frac{1}{L_{inv}C_{BUS}}u & -\frac{1}{L_{inv}C_{BUS}}u^2 \\ -\frac{1}{CL_{inv}C_{BUS}}u & \frac{1}{CL_{inv}C_{BUS}}u - \frac{1}{L_g^2 C} & - & -\frac{1}{L_{inv}L_g C}u \\ & \frac{1}{C_{BUS}^2 L_{inv}}u^3 & \frac{1}{L_g L_{inv}C} & \end{pmatrix}$$

According to Eqn. (11), $\Theta$ is full-rank everywhere except when u=0. Thus, the system is locally observable everywhere except at this singular point. This singular point corresponds to the zero crossings of the grid voltage where the duty ratio is very close to 0.5. Since the converter passes through this singular point every half cycle, a regular observer cannot guarantee robust estimations of the state variables. This results in one of the difficulties regarding the observer design for this particular system.

The other challenge in designing the observer is the unknown value η, which is proportional to $$I_{dc}\left(\eta = \frac{I_{dc}}{C_{BUS}}\right).$$

Figure 2:
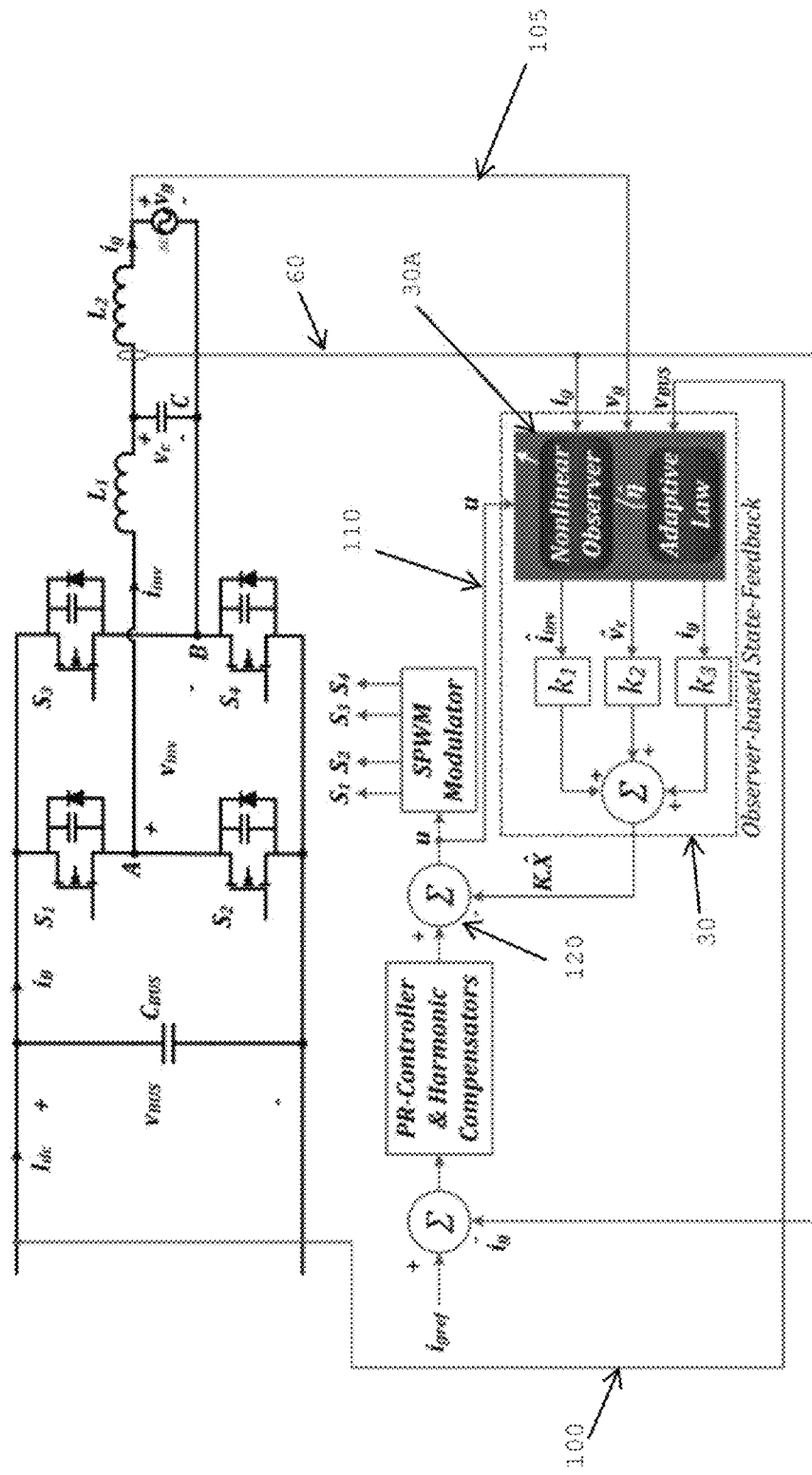
FIG. 2 is a circuit diagram of a system according to one aspect of the invention using an adaptive nonlinear observer subsystem.

In one aspect of the present invention, there is provided an observer-based state-feedback controller. This controller is able to address the above noted challenges related to the state observer. Referring to FIG. 2, a block diagram of a system according to one aspect of the invention is presented. The system in FIG. 2 uses the LCL-filter equipped DC/AC converter with an observer-based state-feedback controller.

In FIG. 2, the linear state feedback block 30 includes a non-linear observer block 30A that takes as input the grid current $i_g$ 60, the bus voltage $v_{BUS}$ 100, the grid voltage $v_g$ 105 and the output u 110 of summation block 120.

In one aspect of the invention, the dynamics of the nonlinear observer are given by:

$$\dot{\hat{x}}_1 = \frac{1}{L_g}\hat{x}_3 - \frac{1}{L_g}v_g + \psi_{11}(X,u)\tilde{x}_1 + \psi_{14}(X,u)\tilde{x}_4 \quad (12)$$

$$\dot{\hat{x}}_2 = \frac{1}{L_{inv}}\hat{x}_4 u - \frac{1}{L_{inv}}\hat{x}_3 + \psi_{21}(X,u)\tilde{x}_1 + \psi_{24}(X,u)\tilde{x}_4 \quad (13)$$

$$\dot{\hat{x}}_3 = \frac{1}{C}\hat{x}_2 - \frac{1}{C}x_1 + \psi_{31}(X,u)\tilde{x}_1 + \psi_{34}(X,u)\tilde{x}_4 \quad (14)$$

$$\dot{\hat{x}}_4 = \hat{\eta} - \frac{1}{C_{BUS}}\hat{x}_2 u + \psi_{41}(X,u)\tilde{x}_1 + \psi_{44}(X,u)\tilde{x}_4 \quad (15)$$

$$\dot{\hat{\eta}} = \gamma \tilde{x}_4 \quad (16)$$

Where $\tilde{x}_i = x_i - \hat{i}_i$ for $i=1,\ldots,4$ and $\tilde{\eta} = \eta - \hat{\eta}$.

The observer gains are given by:

$$\Lambda = \begin{pmatrix} \psi_{11}(X,u) & 0 & 0 & \psi_{14}(X,u) \\ \psi_{21}(X,u) & 0 & 0 & \psi_{24}(X,u) \\ \psi_{31}(X,u) & 0 & 0 & \psi_{34}(X,u) \\ \psi_{41}(X,u) & 0 & 0 & \psi_{44}(X,u) \end{pmatrix} = \begin{pmatrix} \beta_{11} & 0 & 0 & \beta_{14} \\ 0 & 0 & 0 & -\frac{1}{C_{BUS}}u \\ \frac{1}{L_g} & 0 & 0 & 0 \\ \beta_{41} & 0 & 0 & \beta_{44} \end{pmatrix} \quad (17)$$

where $\beta_{ij} \in \mathfrak{R}^+$.

In the present invention, the adaptive observer of Eqns. (12)-(16) is able to precisely estimate the state variables $i_{inv}$ and $v_C$ for the state-feedback controller in the presence of the unknown parameter $I_{dc}$. Because of this, the extra sensors, as well as the conditioning circuits, are eliminated using the observer-based state-feedback controller. The observer of the invention can estimate the system state variables at all operating conditions except the singular points, where the system loses its observability. These singular points correspond to u=1 (or d=0.5 for a bi-polar inverter). Unfortunately, there is not enough information in the system dynamics to make these singular points observable. In this particular system, the required information can be extracted from the DC-bus voltage, $v_{BUS}$, for the singular points. The DC-bus voltage includes a DC component superimposed by a double-frequency ripple. The singular points coincide with the operating points where the DC-bus voltage, $v_{BUS}$, is exactly the same as its DC value. This property can be used to estimate the inverter output current, $i_{inv}$, at singular points.

Figure 3:
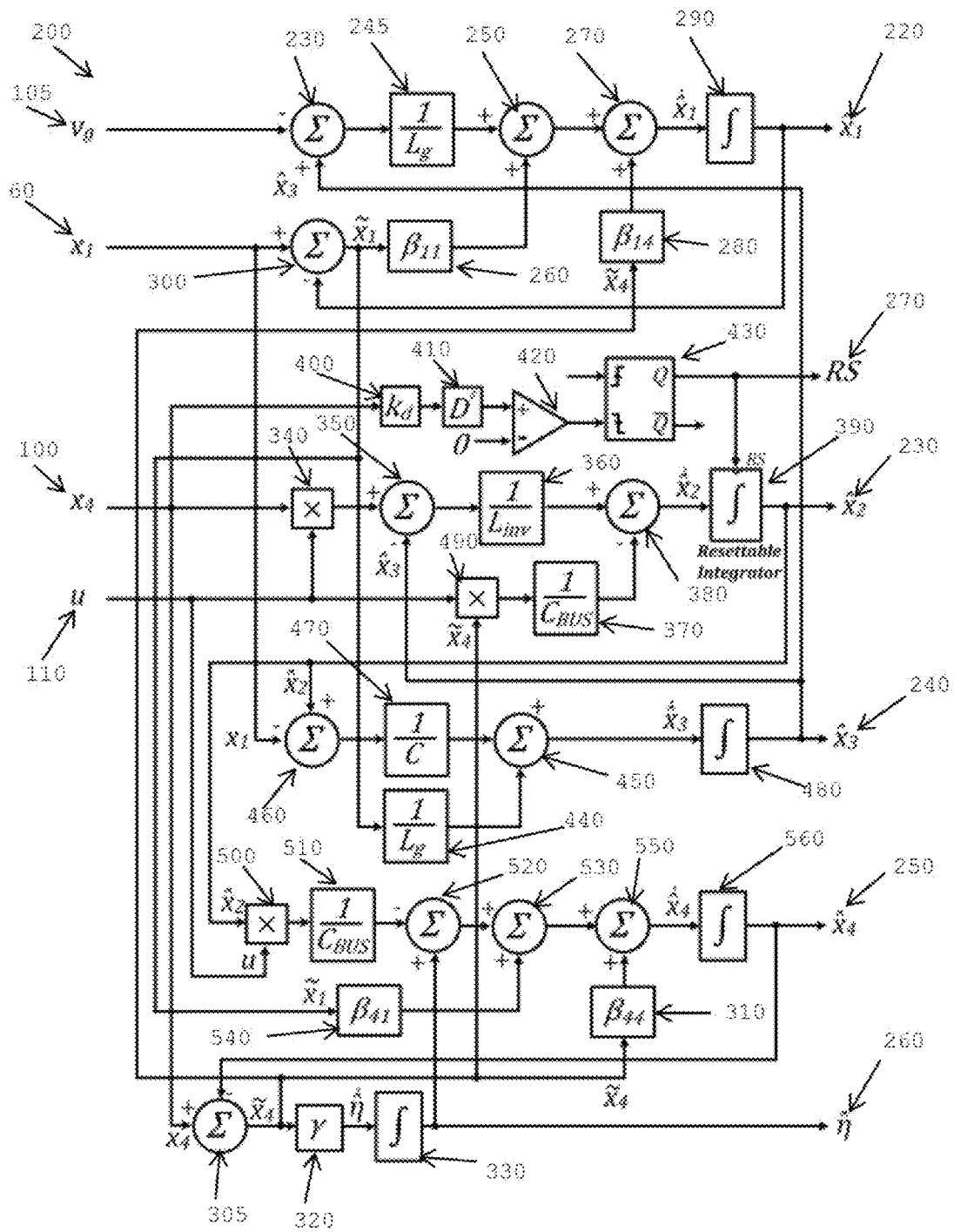
FIG. 3 is a block diagram of the nonlinear observer subsystem according to one aspect of the invention.

Referring to FIG. 3, a block diagram of the adaptive observer according to one aspect of the present invention is presented. This figure shows the implementation of Eqns. (12)-(16) as well as extra compensation for the singular points. According to this figure, the inverter current, $i_{inv}$, resets when the operating point coincides with a singular point detected from the DC-bus voltage. A discrete differentiator is used to extract the double-frequency ripple of $x_4 = v_{BUS}$. The produced signal is used to create the reset signal for $i_{inv}$.

Referring to FIG. 3, a block diagram of an adaptive nonlinear observer subsystem, 200 is presented. Inputs to the subsystem are the bus voltage $v_{BUS}$, the grid current $i_g$, the output u 110 of summation block 120, and grid voltage 105. Outputs of the subsystem are estimated values for the grid current 220, inverter current $i_{inv}$ 230, converter voltage $v_c$ 240, bus voltage $v_{BUS}$ 250, the unknown value η 260, and a reset signal 270.

The input grid voltage 105 is received by a summation block 230 and is subtracted from the estimated converter voltage 240. The result of summation block 230 is passed to a multiplier block 245 which multiplies this result by $1/L_g$. The result of multiplier block 245 is then summed by summation block 250 with the result of multiplier block 260. The result of summation block 250 is summed by summation block 270 with the result of multiplier block 280. The result of summation block 270 is then integrated by integration block 290 to result in the estimated value 220 for the grid current.

The bus voltage 100 is used by summation block 305 to result in $\tilde{x}_4$. This resulting value results from subtracting the estimated value 250 of the bus voltage from the measured value 100 of the bus voltage. This resulting value $\tilde{x}_4$ is multiplied by multiplier block 280 by calculated value $\beta_{14}$. As well, this resulting value is multiplied by multiplier block 310 with calculated value $\beta_{44}$. This resulting value is also multiplied by constant γ using multiplier block 320. The result of multiplier block 320 is then integrated by integration block 330 to result in an estimate for the unknown value η 360.

The bus voltage 100 is also received by multiplier block 340 which multiplies this bus voltage value by the input value u 110. The result of multiplier block 340 is used by summation block 350 to subtract the estimated value 240 of the converter voltage. The result of summation block 350 is then multiplied by $1/L_{inv}$ by multiplier block 360. From this result is subtracted the result of multiplier block 370. Subtraction is done by summation block 380. The result of summation block 380 is then sent to a resettable integrator 390. The result of the resettable integrator 390 is the estimated value 230 for the inverter current.

The bus voltage 100 is also multiplied by multiplier block 400 with constant $k_d$ and the result is multiplied by multiplier block 410 with value $D^z$. The result of multiplier block 410 is sent to an operational amplifier 420. The result of the operational amplifier 420 is received by a flip flop block 430 which acts as a zero crossing detector. The Q output of the flip flop block 430 is then used as the reset signal 270 and is sent to the resettable integrator 390.

The input grid current 60 is received by summation block 300 and from this is subtracted the estimated value 220 of the grid current. This result is then multiplied by multiplier block 260 with calculated value $\beta_{11}$. This same result is multiplied by multiplier block 440 by $1/L_g$ and the result of multiplier block 440 is used by summation block 450.

The input grid current 60 is also received by summation block 460 and this input grid current is subtracted from the estimated value 230 of the inverter current. The result of summation block 460 is multiplied by multiplier block 470 with $1/C$ and is then added with the result of multiplier block 440 by summation block 450. The result of summation block 450 is then sent to integrator block 480 to result in the estimated value 240 for the converter voltage.

The input value u 110 is multiplied by the value $\widetilde{x_4}$ by way of multiplier block 490. The result is then multiplied by multiplier block 370 by $1/C_{BUS}$. This is then used by summation block 380.

Input value u 110 is also multiplied by the estimated value 230 of the inverter current by way of multiplier block 500. The result is multiplied by multiplier block 510 with $1/C_{BUS}$. The result of block 510 is subtracted from the estimate 260 for unknown value $\eta$ 360 by summation block 520. The result of block 520 is then added by summation block 530 to the product of the result of block 300 and calculated value $\beta_{41}$. This product is produced by multiplier block 540. The result of summation block 530 is then added by summation block 550 to the result of multiplier block 310. The resulting sum from block 550 is then received by integration block 560 to result in the estimated value 250 for the bus voltage.

As noted above, the input value u is based on the duty ratio of the full-bridge inverter of the DC/AC converter. In Eqn. (9) it should be clear that u=2d−1 where d is the duty ratio of the inverter.

Figure 4:
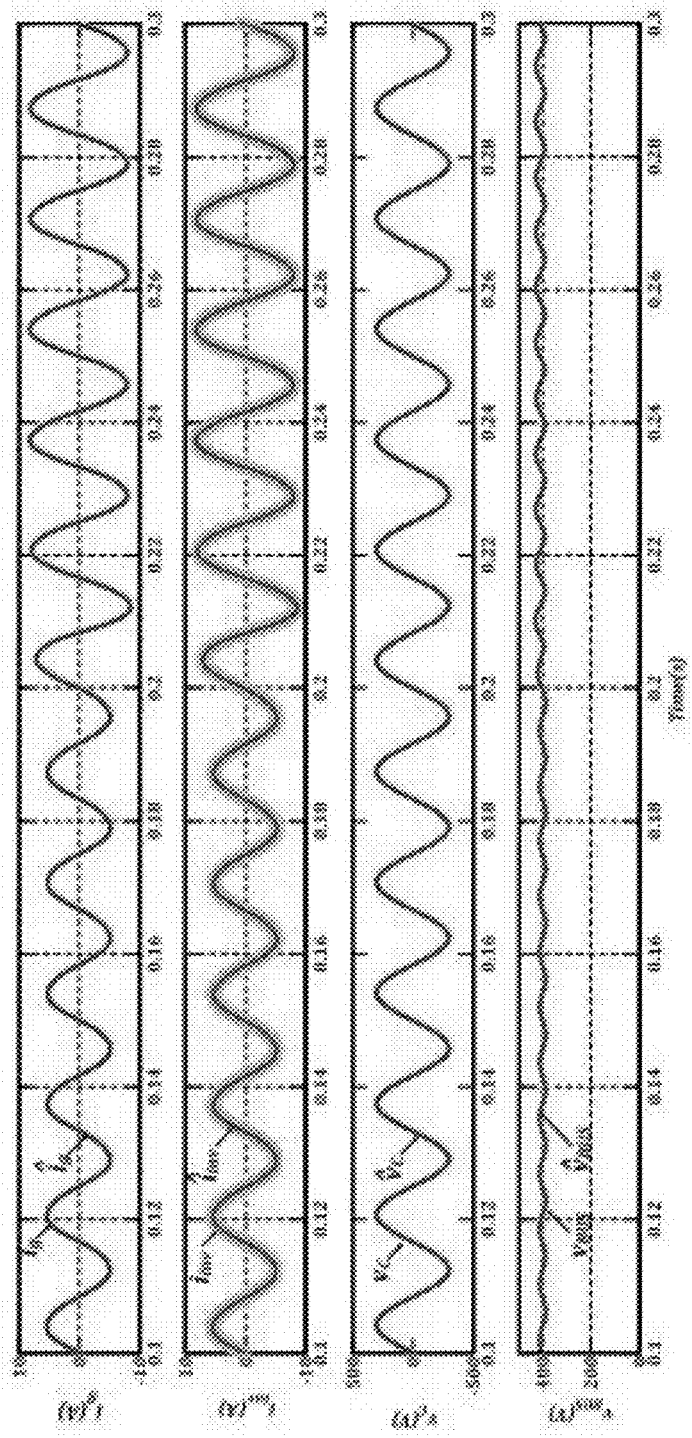
FIG. 4 shows Matlab/Simulink waveforms of the observer-based state-feedback controller according to one aspect of the invention.
Figure 5:
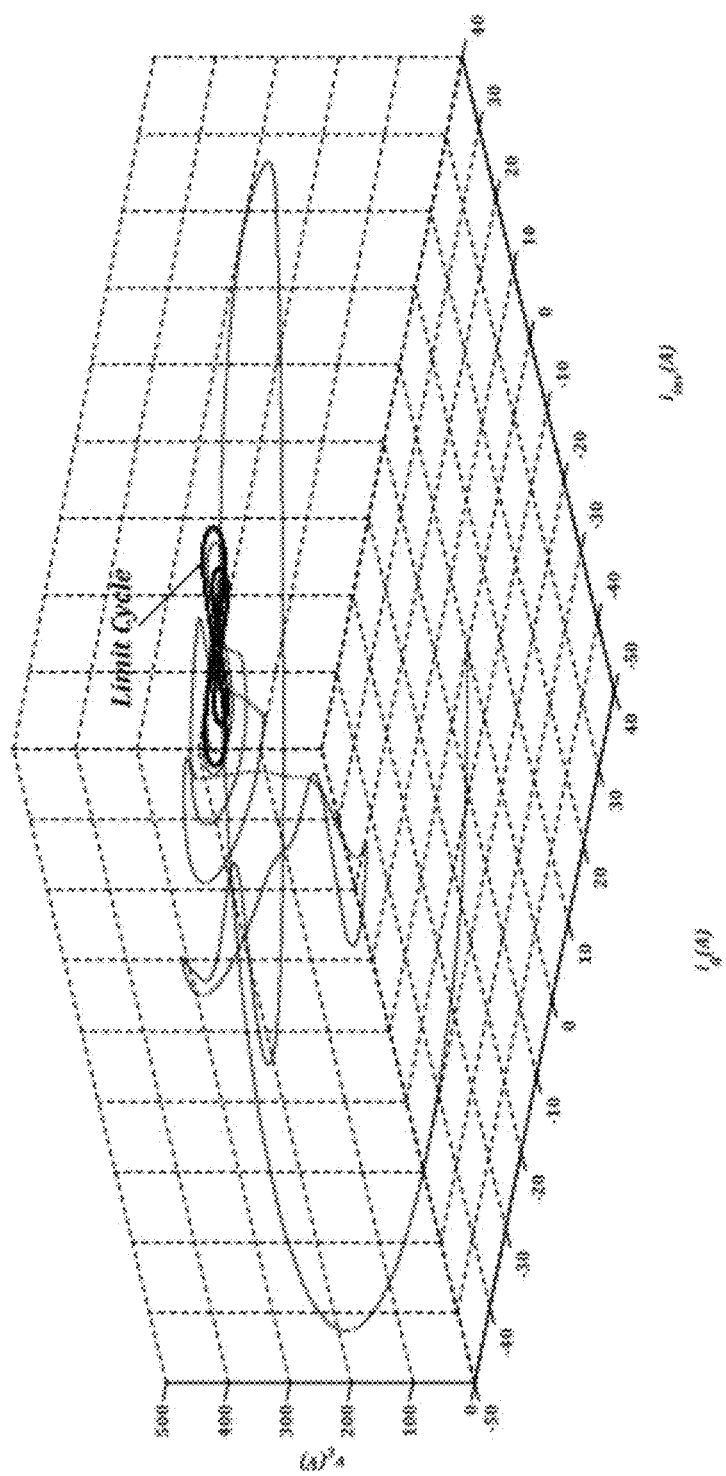
FIG. 5 illustrates the trajectory for the observer system of the invention.
Figure 6:
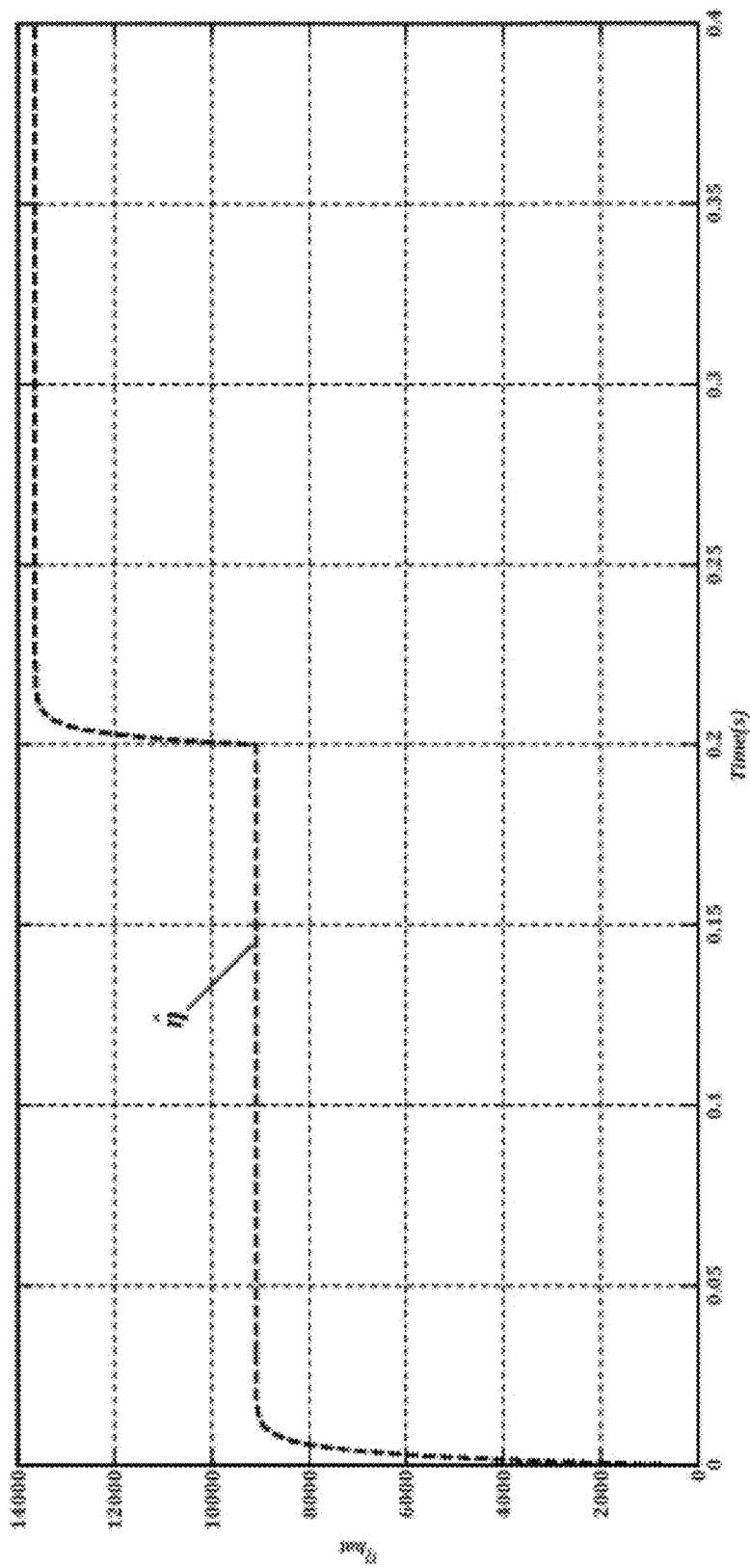
FIG. 6 illustrates the adaptive estimation of the value for $$\frac{I_{dc}}{C_{BUS}};$$

The useful aspects of the observer are its speed of convergence as well as its accuracy and robustness. In order to evaluate the performance of the observer-based state-feedback controller, a Matlab/SIMULINK simulation was conducted. The closed-loop control system of the DC/AC inverter includes an external voltage loop, which determines the amplitude of the grid current reference signal, and an internal current loop, which controls the grid current. The current loop consists of a Proportional-Resonant (PR) controller superimposed with the observer-based state-feedback controller. FIG. 4 shows the inverter's waveforms using the observer-based state-feedback controller. FIG. 4 illustrates the stable performance of the observer-based state-feedback controller. Trajectory of the observer is shown in FIG. 5. This figure shows the convergence of the observer to the limit cycle. FIG. 6 shows the adaptive estimation of $$\frac{I_{dc}}{C_{BUS}}.$$

This figure illustrates the fast estimation of this parameter.

Figure 7:
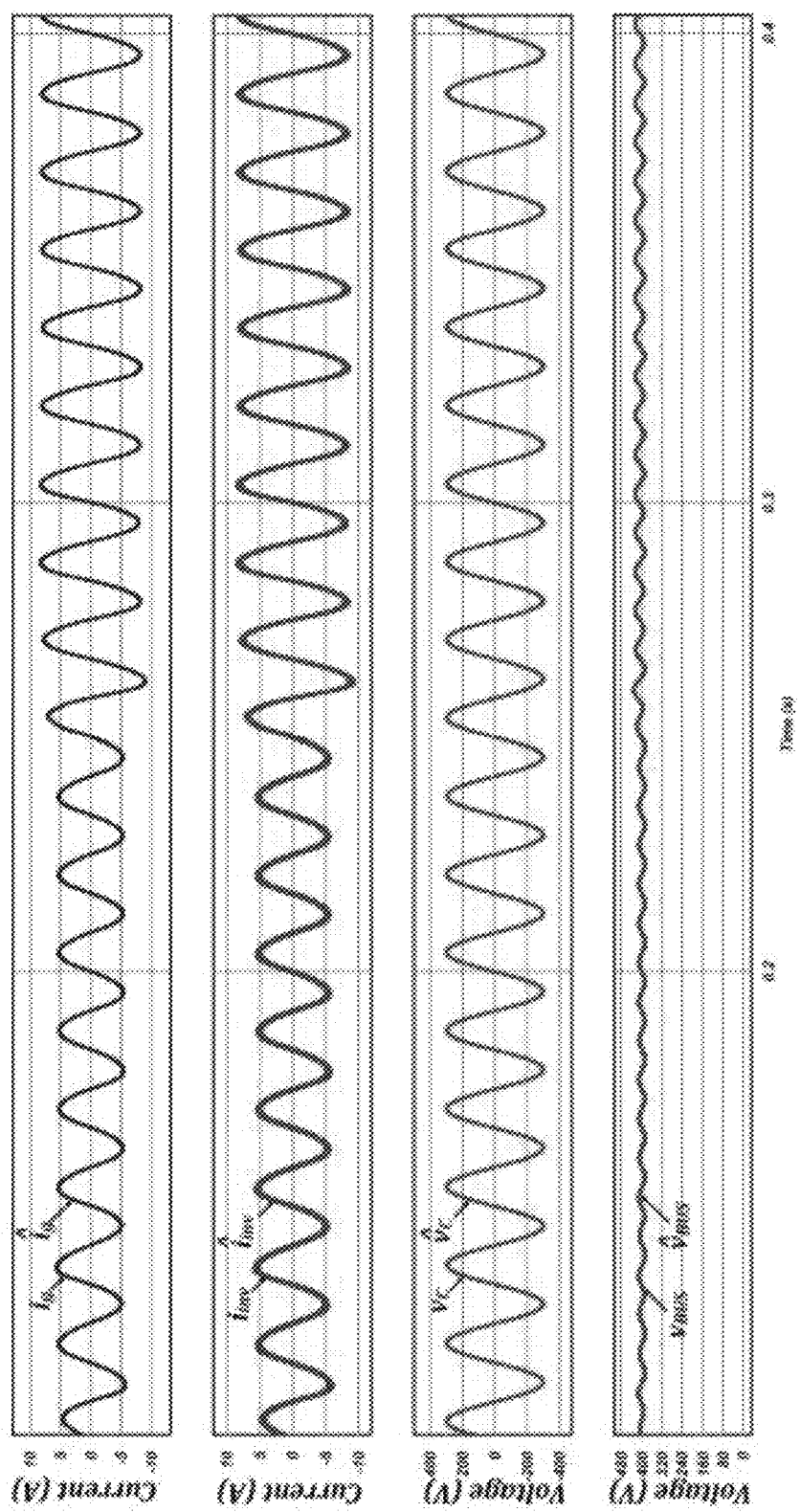
FIG. 7 illustrates the transient response of the closed-loop control system of the invention.
Figure 8:
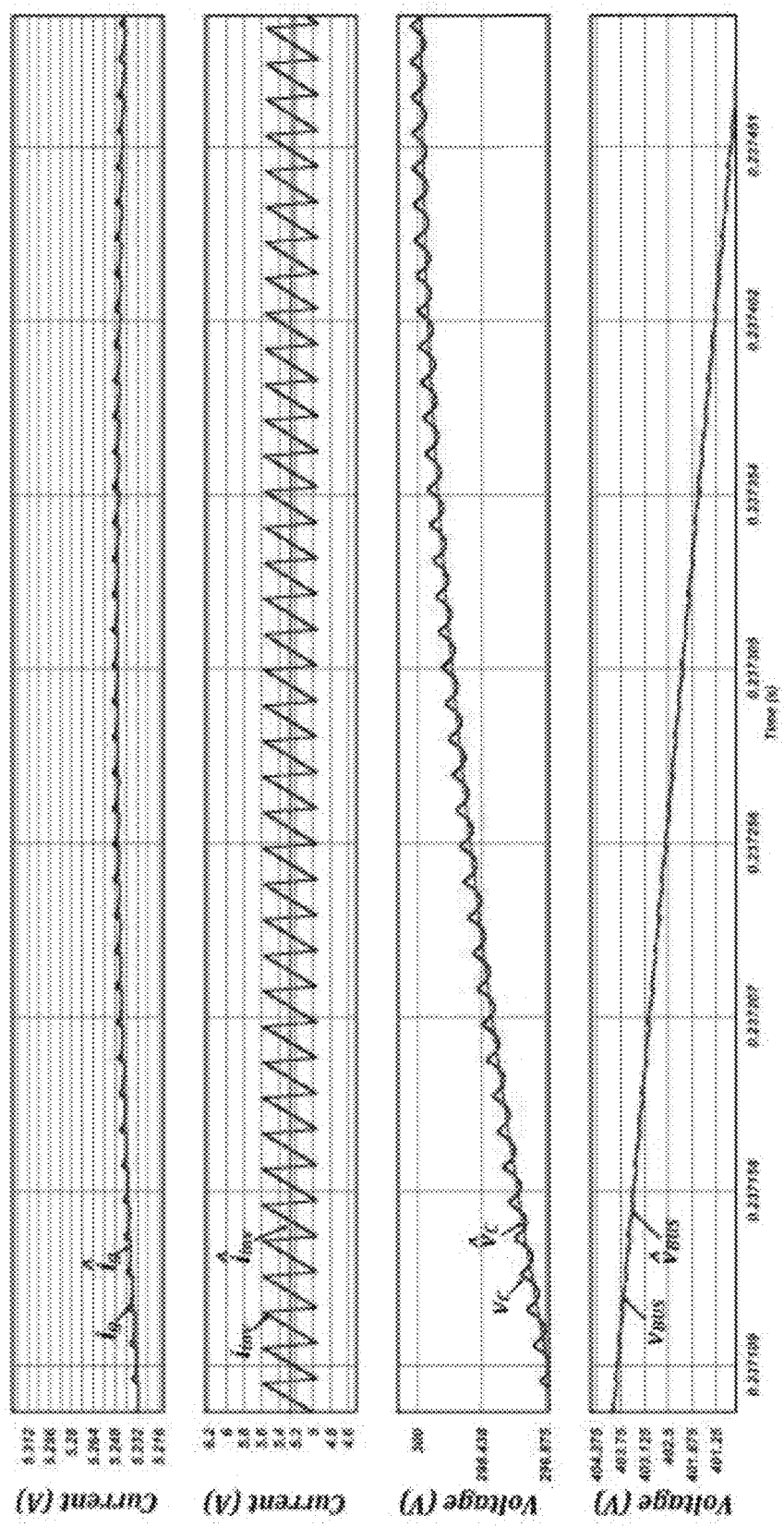
FIG. 8 is an enlarged version of the transient response illustrated in FIG. 7.

FIG. 7 shows the transient response of the closed-loop control system using PSIM simulation software. This figure shows a smooth and robust transient response of the observer-based state-feedback control system. FIG. 8 is an enlarged version of FIG. 7. FIG. 8 illustrates the precise estimation of the state variables using the adaptive observer.

Figure 9:
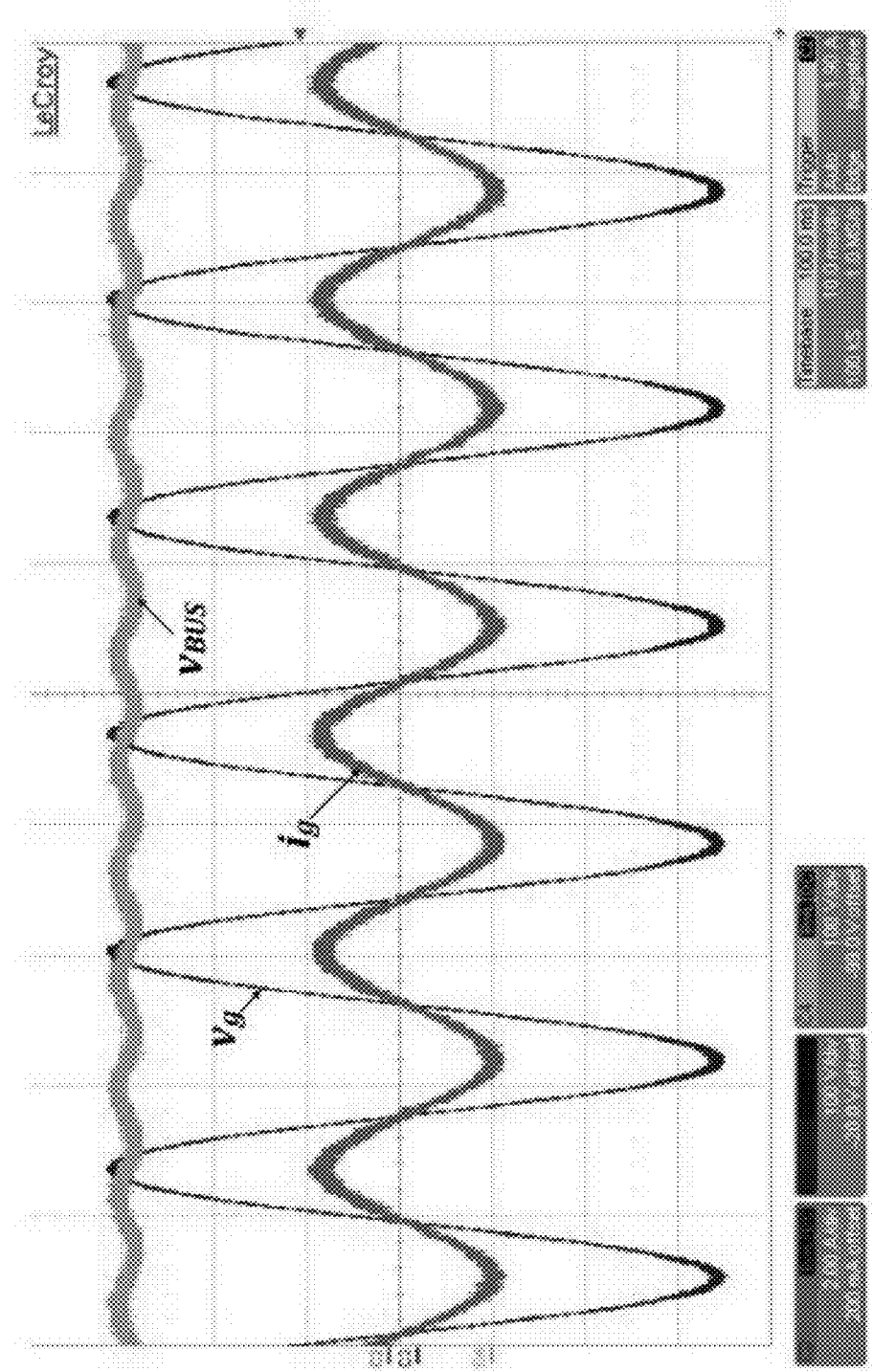
FIG. 9 illustrate experimental waveforms of the DC/AC inverter.
Figure 10:
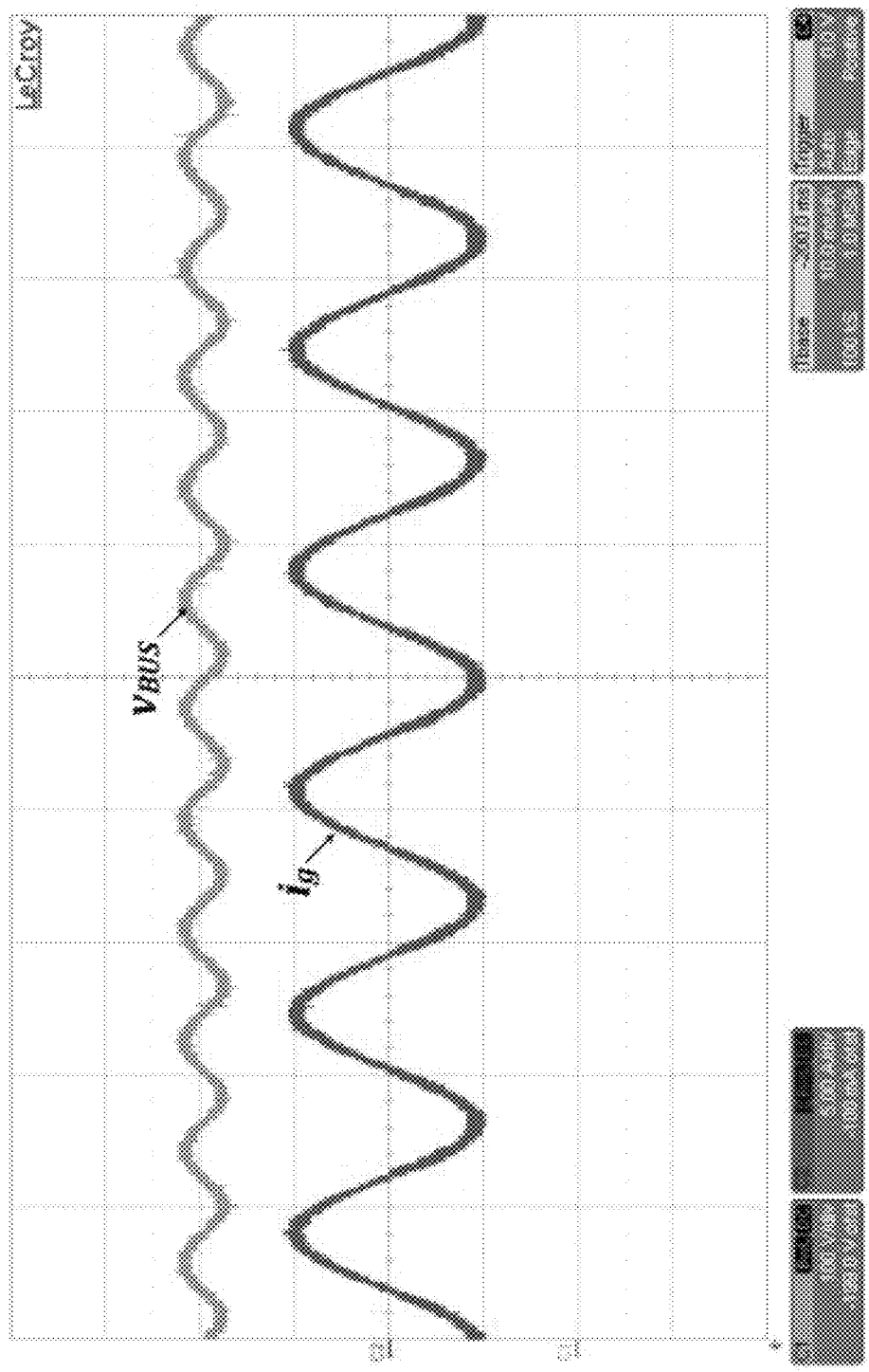
FIG. 10 illustrate experimental waveforms of the DC/AC inverter at full-load.
Figure 11:
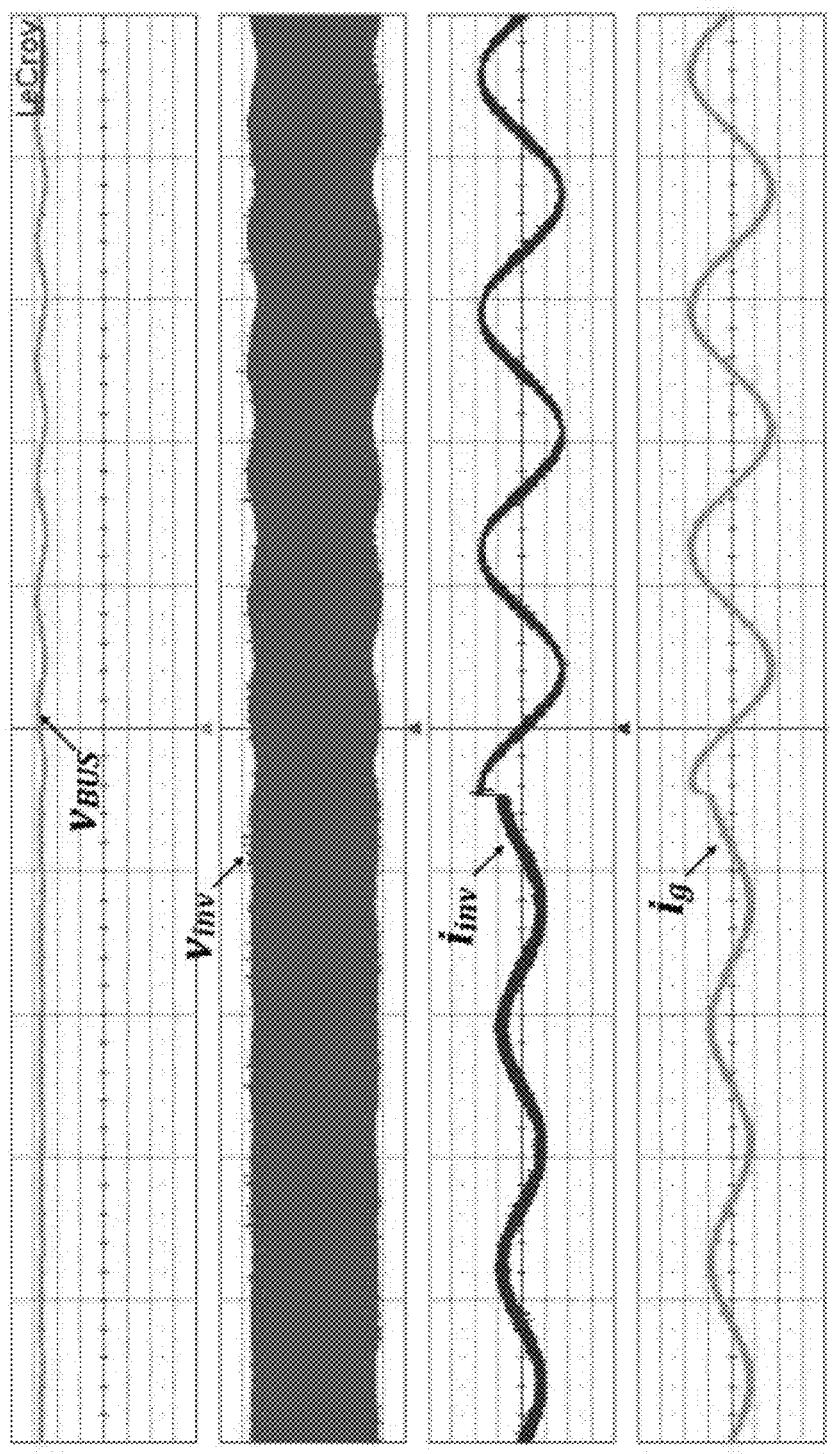
FIG. 11 shows experimental waveforms of the DC/AC inverter during transient for a positive step change.
Figure 12:
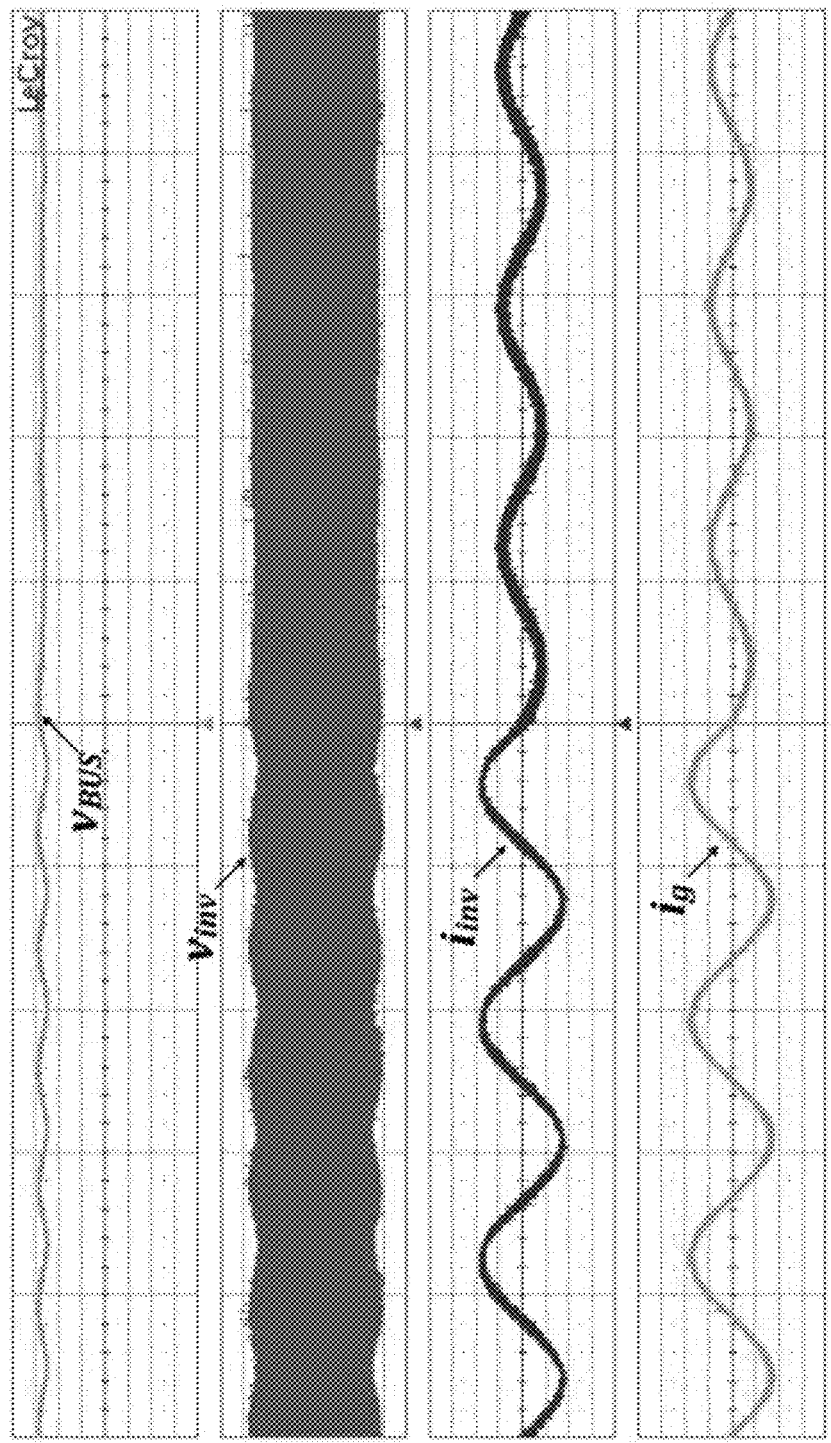
FIG. 12 illustrates experimental waveforms of the DC/AC inverter during transient for a negative step change.

In order to confirm the feasibility of the control system in the present invention, a 1 kW DC/AC inverter prototype was implemented. FIGS. 9 and 10 show the experimental results of the DC/AC inverter using the closed-loop control system for two different loads. The experimental results demonstrate the robust and stable operation of the converter with the observer-based state-feedback controller. FIGS. 11 and 12 show the transient performance of the closed-loop control system. According to FIGS. 11 and 12, the closed-loop system demonstrates a very smooth transient and the observer is able to very quickly and accurately estimate the state variables.

For a better understanding of the invention, the following references may be consulted. All of the following references, in their entirety, are hereby incorporated by reference:

Dasgupta, S.; Sahoo, S. K.; Panda, S. K., "Single-Phase Inverter Control Techniques for Interfacing Renewable Energy Sources WithMicrogrids Part I: Parallel-Connected Inverter Topology With Active and Reactive Power Flow Control Along With Grid Current Shaping," Power Electronics, IEEE Transactions on, vol. 26, no. 3, pp. 717-731, March 2011.

Selvajyothi, K.; Janakiraman, P. A., "Reduction of Voltage Harmonics in Single Phase Inverters Using Composite Observers," Power Delivery, IEEE Transactions on, vol. 25, no. 2, pp. 1045-1057, April 2010.

Mastromauro, R. A.; Liserre, M.; Dell'Aquila, A., "Study of the Effects of Inductor Nonlinear Behavior on the Performance of Current Controllers for Single-Phase PV Grid Converters," Industrial Electronics, IEEE Transactions on, vol. 55, no. 5, pp. 2043-2052, May 2008.

Mohamed, Y. A.-R. I., "Mitigation of Converter-Grid Resonance, Grid-Induced Distortion, and Parametric Instabilities in Converter-Based Distributed Generation," Power Electronics, IEEE Transactions on, vol. 26, no. 3, pp. 983-996, March 2011.

Liserre, M.; Blaabjerg, F.; Hansen, S., "Design and control of an LCL-filter-based three-phase active rectifier," Industry Applications, IEEE Transactions on, vol. 41, no. 5, pp. 1281-1291, September-October 2005.

Yi Tang; Poh Chiang Loh; Peng Wang; FookHoongChoo; Feng Gao; Blaabjerg, F., "Generalized Design of High Performance Shunt Active Power Filter With Output LCL Filter," Industrial Electronics, IEEE Transactions on, vol. 59, no. 3, pp. 1443-1452, March 2012.

Hea-GwangJeong; Kyo-Beum Lee; Sewan Choi; Woojin Choi, "Performance Improvement of LCL-Filter-Based Grid-Connected Inverters Using PQR Power Transformation," Power Electronics, IEEE Transactions on, vol. 25, no. 5, pp. 1320-1330, May 2010.

Fei Liu; Yan Zhou; ShanxuDuan; Jinjun Yin; Bangyin Liu; Fangrui Liu, "Parameter Design of a Two-Current-Loop Controller Used in a Grid-Connected Inverter System With LCL Filter," Industrial Electronics, IEEE Transactions on, vol. 56, no. 11, pp. 4483-4491, November 2009.

Gabe, I. J.; Montagner, V. F.; Pinheiro, H., "Design and Implementation of a Robust Current Controller for VSI Connected to the Grid Through an LCL Filter," Power Electronics, IEEE Transactions on, vol. 24, no. 6, pp. 1444-1452, June 2009.

Guoqiao Shen; Xuancai Zhu; Jun Zhang; Dehong Xu; "A New Feedback Method for PR Current Control of LCL-Filter-Based Grid-Connected Inverter," Industrial Electronics, IEEE Transactions on, vol. 57, no. 6, pp. 2033-2041, June 2010.

Guoqiao Shen; Dehong Xu; Luping Cao; Xuancai Zhu, "An Improved Control Strategy for Grid-Connected Voltage Source Inverters with an LCL Filter," Power Electronics, IEEE Transactions on, vol. 23, no. 4, pp. 1899-1906, July 2008.

Dannehl, J.; Fuchs, F. W.; Hansen, S.; Thgersen, P. B., "Investigation of Active Damping Approaches for PI-Based Current Control of Grid-Connected Pulse Width Modulation Converters With LCL Filters," Industry Applications, IEEE Transactions on, vol. 46, no. 4, pp. 1509-1517, July-August 2010.

Eric Wu; Lehn, P. W., "Digital Current Control of a Voltage Source Converter with Active Damping of LCL Resonance," Power Electronics, IEEE Transactions on, vol. 21, no. 5, pp. 1364-1373, September 2006.

Eren, S.; Pahlevaninezhad, M.; Bakhshai, A.; Jain, P. K., "Composite Nonlinear Feedback Control and Stability Analysis of a Grid-Connected Voltage Source Inverter with LCL Filter," Industrial Electronics, IEEE Transactions on, vol. 60, no. 11, pp. 5059, 5074, November 2013.

Eren, S.; Pahlevaninezhad, M.; Bakhshai, A.; Jain, P., "An Adaptive Droop DC-Bus Voltage Controller for a Grid-Connected Voltage Source Inverter with LCL Filter," Power Electronics, IEEE Transactions on, vol. PP, no. 99, pp. 1, 2014.

It should be noted that the controller according to one aspect of the invention may be implemented as software on a regular DSP (digital signal processing) chip or in an FPGA (fixed pin grid array). As well, the controller may be implemented as software in an ASIC (application specific integrated circuit). For such an implementation, the various equations noted above would be executed and implemented as computer instructions for a processor.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for use in controlling a DC/AC converter, the system comprising:
    a non-linear observer subsystem for estimating an inverter current from said converter and for estimating a converter voltage,
wherein
    outputs of said subsystem are used to control transistors of said converter; and
    said subsystem receives, as input,
        a grid current from said converter, and
        a bus voltage of an input to said converter.

2. A system according to claim 1 wherein said system further comprises a proportional resonant controller and a linear state feedback controller.

3. A system according to claim 1 further comprising a sinusoidal pulse width modulation modulator, said modulator being used to send control signals to said transistors of said converter, said modulator creating said control signals from outputs of said subsystem.

4. A system according to claim 1 wherein said subsystem further receives as input a value derived from a duty ratio of a full bridge inverter, said full bridge inverter comprising part of said DC/AC converter.

5. A system according to claim 1 wherein said subsystem has dynamics which is given by:

$$\dot{\hat{x}}_1 = \frac{1}{L_g}\hat{x}_3 - \frac{1}{L_g}v_g + \psi_{11}(X,u)\tilde{x}_1 + \psi_{14}(X,u)\tilde{x}_4$$

$$\dot{\hat{x}}_2 = \frac{1}{L_{inv}}\hat{x}_4 u - \frac{1}{L_{inv}}\hat{x}_3 + \psi_{21}(X,u)\tilde{x}_1 + \psi_{24}(X,u)\tilde{x}_4$$

$$\dot{\hat{x}}_3 = \frac{1}{C}\hat{x}_2 - \frac{1}{C}x_1 + \psi_{31}(X,u)\tilde{x}_1 + \psi_{34}(X,u)\tilde{x}_4$$

$$\dot{\hat{x}}_4 = \hat{\eta} - \frac{1}{C_{BUS}}\hat{x}_2 u + \psi_{41}(X,u)\tilde{x}_1 + \psi_{44}(X,u)\tilde{x}_4$$

$$\dot{\hat{\eta}} = \gamma\tilde{x}_4$$

where $\tilde{x}_i = x_i - \hat{x}_i$ for $i=1, \ldots, 4$ and $\tilde{\eta} = \eta - \hat{\eta}$ and
where
    $x_1 = i_g$ is a grid current;
    $x_2 = i_{inv}$ is an inverter current;
    $x_3 = v_C$ is a converter voltage; and
    $x_4 = v_{BUS}$ is an input bus voltage for said system.

6. A system according to claim 1 wherein an inverter current in said subsystem resets when an operating point coincides with a singular point detected from a DC-bus voltage of said converter.

7. A system according to claim 1 wherein said DC/AC converter comprises an LCL-filter.

* * * * *

UNITED STATES PATENT AND TRADEMARK OFFICE
CERTIFICATE OF CORRECTION

PATENT NO. : 9,729,085 B2  
APPLICATION NO. : 14/838505  
DATED : August 8, 2017  
INVENTOR(S) : Majid Pahlevaninezhad et al.

Page 1 of 1

It is certified that error appears in the above-identified patent and that said Letters Patent is hereby corrected as shown below:

On the Title Page

The inventor "Shangzhi PAN" should be included. The correct order of inventorship is as outlined below:
1) EREN, Suzan;
2) PAHLEVANINEZHAD, Majid;
3) PAN, Shangzhi; and
4) JAIN, Praveen.

Signed and Sealed this  
Twentieth Day of November, 2018

Andrei Iancu  
*Director of the United States Patent and Trademark Office*